June 12, 1923.
W. T. GODDARD
INSULATOR
Filed April 11, 1918
1,458,755
2 Sheets-Sheet 1
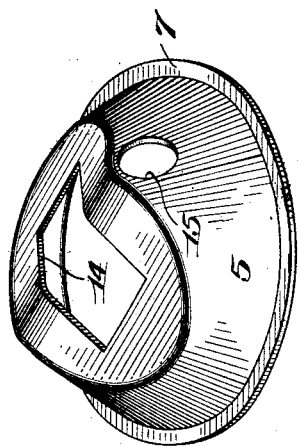
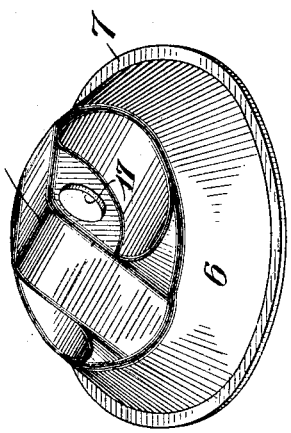
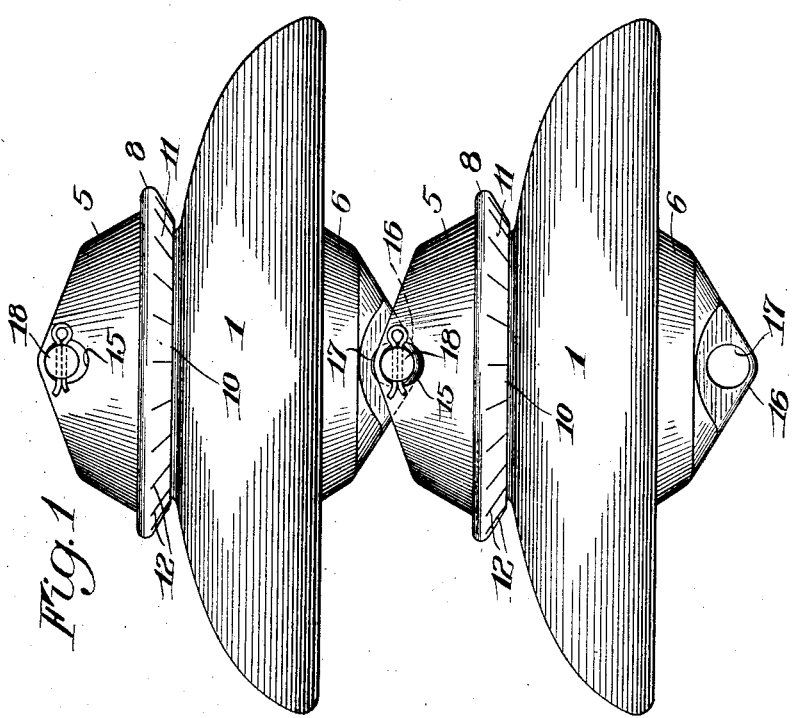
WITNESSES:
Nelson H. Copp
INVENTOR.
Walter T. Goddard
BY
his ATTORNEYS.

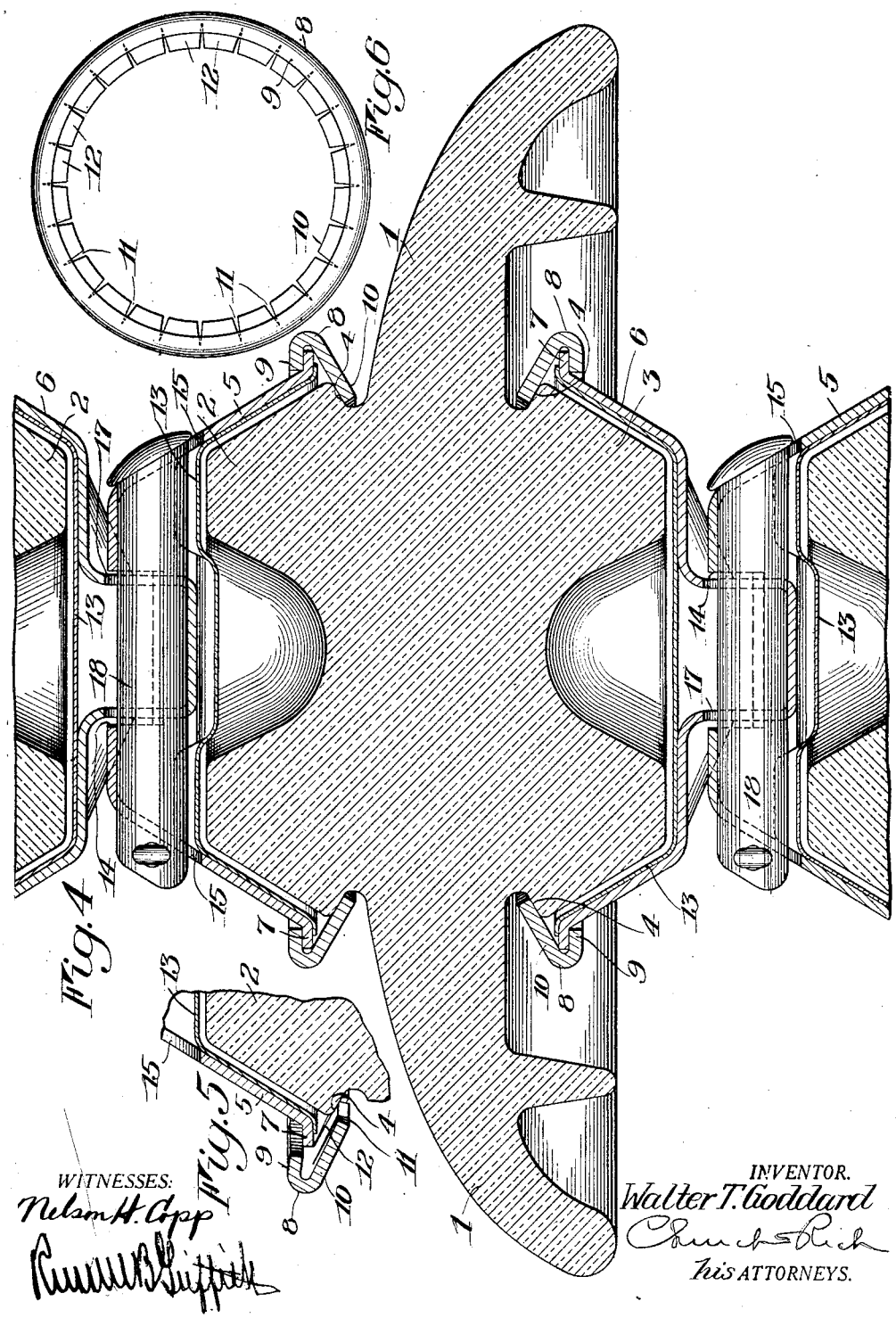

Patented June 12, 1923.

1,458,755

UNITED STATES PATENT OFFICE.

WALTER T. GODDARD, OF VICTOR, NEW YORK, ASSIGNOR, BY MESNE ASSIGNMENTS, TO LOCKE INSULATOR CORPORATION, OF BALTIMORE, MARYLAND, A CORPORATION OF MARYLAND.

INSULATOR.

Application filed April 11, 1918. Serial No. 227,917.

*To all whom it may concern:*

Be it known that I, WALTER T. GODDARD, of Victor, in the county of Ontario and State of New York, have invented certain new and useful Improvements in Insulators; and I do hereby declare the following to be a full, clear, and exact description of the same, reference being had to the accompanying drawings, forming a part of this specification, and to the reference numerals marked thereon.

My present invention relates to electrical apparatus and more particularly to insulators of the high tension suspension type. Such insulators consist partly of an insulating member and partly of what is termed a strain member by means of which the insulating member is supported or through which it supports other insulating elements. The invention has for its object to provide such an insulator embodying an improved mode of connecting the strain and insulating members together so that the frangible insulating member will be securely attached to the supporting parts yet with a free or floating engagement so as not to impose unnatural or localized strains upon it through the expanding and contracting effects of temperature or otherwise. To these and other ends the invention resides in certain improvements and combinations of parts all as will be hereinafter more fully described, the novel features being pointed out in the claims at the end of the specification.

In the drawings:

Figure 1 is a side view of two suspended insulators of a series constructed in accordance with and illustrating one embodiment of my invention;

Figure 2 is a perspective view of one of the strain members;

Figure 3 is a similar view of the other strain member;

Figure 4 is a central vertical section through the insulators shown in Figure 1, with portions of the upper and lower ones broken away;

Figure 5 is a fragmentary section similar to Figure 4 illustrative of the relationship of the connecting ring of the strain member before it is contracted upon the insulating member, and Figure 6 is a top view of the attaching ring of the strain member.

Similar reference numerals throughout the several views indicate the same parts.

Referring more particularly to the drawings, 1 indicates the body or skirt of the insulator member composed of porcelain or similar material and centrally of this body at top and bottom I provide heads or lugs 2 and 3 which are preferably tapered toward their outer ends, as shown. while at their bases they are provided with inclined, undercut, annular shoulders 4. Fitting over these lugs, loosely and spaced therefrom, are the cup-shaped body portions 5 and 6 of the strain members through which, respectively, the insulator member is supported and it supports other insulators. These strain members 5 and 6 are preferably formed up of sheet material, as shown in Figures 2 and 3, and at their bases they are provided with outwardly turned annular flanges 7. Spun over these flanges to lie against the same and confine them are attaching rings 8, one of which is shown detached in Figure 6. Each ring comprises a flange 9 having a superposed relationship with the flange 7 and a longer inclined flange 10 which takes a supporting engagement with the inclined shoulder 4 of the insulator member 1. This flange 10 is notched or slotted radially at 11 throughout its circumference to divide it into a series of independent fingers 12 that engage the shoulder 4. The general fit of the attaching ring 8 to the lug is a loose or sliding one to permit slippage and an unrestrained occupation of the cup-shaped strain member by the lug on the insulator member, except in so far as one is supported by the other, the extreme diameter of the lug, of course, being greater than the mean diameter of the ring. The result is that both the insulator member and the strain member are free to adapt themselves to each other as they expand or contract under changes in temperature and to still maintain a free but secure engagement. The materials of the two parts have different coefficients of expansion and the temperature of one is apt to change more rapidly than that of the other under certain conditions as, for instance, during rain storms. The fingers 12 of the attaching rings 8 also act to distribute or apportion the strains upon the shoulders 4. If the surfaces of the latter are uneven in slight degree so that initial contact would be made with only a proportion of the fingers, these fingers yield as the strain of the weight is imposed and allow a due proportion to be borne by the other fingers. In this way, more frequent cause of breakage in the insulator members is obviated.

Preferably, lining cups 13 of thinner sheet material are placed inside of the strain cups 5, also out of contact with the lugs 2 and 3.

The strain member 5 has an opening 14 in its top and is provided with lateral apertures 15 while the strain member 6 has a correspondingly embossed portion 16 at its center provided with lateral apertures 17. Member 6 being at the bottom of the insulator, and member 5 at the top, in the present instance, the member 6 of one unit is inserted in the opening 14 of the other and a bolt 18 then passed through the apertures 15 and 17 whereby the units are suspended one from the other, as clearly shown in Figures 1 and 4 of the drawings.

I claim as my invention:

1. The combination with an insulator provided with a central attaching head or lug having an annular undercut shoulder, of a two-part strain member loosely connected to the attaching head, said strain member comprising a cup-shaped body portion embracing said lug, said portion provided with a peripheral flange and an attaching ring, said ring being adapted to embrace the flange of the cup-shaped body and to have a supporting engagement with the annular shoulder of the said head.

2. The combination with an insulator provided with a central attaching head or lug having an annular undercut shoulder, of a two-part strain member loosely connected to the attaching head, said strain member comprising a cup-shaped body portion having an outwardly directed peripheral flange and an attaching ring, said ring being adapted to embrace the flange of the cup-shaped body portion and being provided with a plurality of independently yielding fingers having supporting engagement with the annular shoulder of the said head.

3. A strain member adapted for use with an insulator provided with a central attaching head or lug having an annular undercut shoulder, said strain member comprising a cup shaped body portion having an outwardly turned flange and an attaching ring, said ring being adapted to engage the flange of the cup-shaped portion and provided with a plurality of independently yielding fingers adapted to engage the said shoulder of the attaching head.

4. The combination with an insulator provided with a central attaching head or lug having an annular undercut shoulder, of a strain member loosely engaging over the head or lug and comprising a cup-shaped body portion embracing said lug, said portion having an outwardly turned flange and an attaching ring having a flange engaging that on the body portion and another flange loosely engaging the undercut shoulder of the insulator so as to slide thereon.

5. The combination with an insulator having upper and lower central attaching heads or lugs, of a cup-shaped strain member engaging each lug, one of said members being provided with a central opening and lateral apertures and the other being provided with a central embossed portion having lateral apertures whereby it is adapted to be inserted in a strain member formed in accordance with the first mentioned strain member on an adjacent insulator and secured by a pin extending through the apertures.

WALTER T. GODDARD.

Witness:
AGNES NESBITT BISSELL.